(12) United States Patent
Wang et al.

(10) Patent No.: US 9,924,417 B2
(45) Date of Patent: *Mar. 20, 2018

(54) METHOD AND APPARATUS OF SIGNALING AND PROCEDURE FOR SEQUENCE HOPPING PATTERN CHANGE DURING HANDOVER

(71) Applicant: InterDigital Patent Holdings, Inc., Wilmington, DE (US)

(72) Inventors: Jin Wang, Princeton, NJ (US); Joseph S. Levy, Merrick, NY (US); Stephen E. Terry, Northport, NY (US); Ulises Olvera-Hernandez, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/946,425

(22) Filed: Nov. 19, 2015

(65) Prior Publication Data

US 2016/0080986 A1 Mar. 17, 2016

Related U.S. Application Data

(63) Continuation of application No. 12/273,598, filed on Nov. 19, 2008, now Pat. No. 9,204,344.

(Continued)

(51) Int. Cl.
*H04W 36/00* (2009.01)
*H04J 13/00* (2011.01)
*H04W 16/02* (2009.01)

(52) U.S. Cl.
CPC ..... *H04W 36/0061* (2013.01); *H04J 13/0074* (2013.01); *H04W 16/02* (2013.01); *H04W 36/0055* (2013.01); *H04B 2201/70702* (2013.01)

(58) Field of Classification Search
CPC .. H04J 11/0069; H04L 27/2656; H04W 36/02
See application file for complete search history.

(56) References Cited

U.S. PATENT DOCUMENTS 5,448,569 A 9/1995 Huang et al.
7,373,161 B2 5/2008 Anderson
(Continued)

FOREIGN PATENT DOCUMENTS

CN 1744746 A 3/2006
CN 1744753 A 3/2006
(Continued)

OTHER PUBLICATIONS

NTT Docomo et al., "Sequence Hopping and Cyclic-Shift Value Hopping for Uplink Reference Signal in E-UTRA," 3GPP TSG RAN WG1 Meeting #48bis, R1-071643 (Mar. 26-30, 2007).

(Continued)

*Primary Examiner* — Chandrahas Patel
(74) *Attorney, Agent, or Firm* — Volpe and Koenig, P.C.

(57) ABSTRACT

A method and apparatus are provided for updating a sequence hopping (SH) pattern of an uplink channel during handover from a current cell having a current SH pattern. At least one downlink channel of each neighbor cell of the current cell is monitored. Information indicative of the monitored downlink channels of the neighbor cells is transmitted to the current cell. Prior to receiving a handover command from the current cell a target cell from among the neighbor cells is anticipated and a common downlink channel of the anticipated target cell is monitored to determine information representative of a target SH pattern of the target cell.

18 Claims, 4 Drawing Sheets

Related U.S. Application Data

(60) Provisional application No. 60/989,327, filed on Nov. 20, 2007.

(56) References Cited

U.S. PATENT DOCUMENTS

| | | | |
|---|---|---|---|
| 7,606,205 | B2 | 10/2009 | Ranta-Aho et al. |
| 7,711,367 | B2 | 5/2010 | Cheng et al. |
| 8,542,571 | B2* | 9/2013 | Kim .................... H04J 11/0069 370/208 |
| 2005/0120097 | A1 | 6/2005 | Walton et al. |
| 2006/0172716 | A1 | 8/2006 | Yoshii et al. |
| 2006/0240831 | A1 | 10/2006 | Toskala et al. |
| 2007/0047493 | A1 | 3/2007 | Park et al. |

FOREIGN PATENT DOCUMENTS

| | | |
|---|---|---|
| EP | 1 773 009 | 4/2007 |
| EP | 1 819 186 | 8/2007 |
| JP | 2006-303739 | 11/2006 |
| WO | 07/055526 | 5/2007 |
| WO | 07/066882 | 6/2007 |
| WO | 07/127902 | 11/2007 |

OTHER PUBLICATIONS

Panasonic, "RS sequence hopping for PUSCH and PUCCH," 3GPP TSG RAN WG1 Meeting #51, R1-074904 (Nov. 5-9, 2007).
Texas Instruments, "Sequence Hopping for the Uplink Reference Signal," 3GPP TSG RAN WG1 #48bis, R1-071485 (Mar. 26-30, 2007).
Third Generation Partnership Project, "Technical Specification Group Radio Access Network; Requirements for Evolved UTRA (E-UTRA) and Evolved UTRAN (E-UTRAN)" (Release 7), 3GPP TR 25.913 V7.3.0 (Mar. 2006).
Third Generation Partnership Project, "Technical Specification Group Radio Access Network; Requirements for Evolved UTRA (E-UTRA) and Evolved UTRAN (E-UTRAN)" (Release 8), 3GPP TR 25.913 V8.0.0 (Dec. 2008).
Third Generation Partnership Project, "Technical Specification Group Radio Access Network; Physical layer aspects for evolved Universal Terrestrial Radio Access (UTRA)" (Release 7), 3GPP TR 25.814 V7.1.0 (Sep. 2006).
Third Generation Partnership Project, "Technical Specification Group Radio Access Network; Evolved Universal Terrestrial Radio Access (E-UTRA); Physical channels and modulation" (Release 8), 3GPP TS 36.211 V8.0.0 (Sep. 2007).
Third Generation Partnership Project, "Technical Specification Group Radio Access Network; Evolved Universal Terrestrial Radio Access (E-UTRA); Physical channels and modulation" (Release 8), 3GPP TS 36.211 V8.4.0 (Sep. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.3.0 (Sep. 2008).
Ericsson, "Physical-layer parameters to be configured by RRC," TSG-RAN WG1 #49bis, R1-073165 (Jun. 25-29, 2007).
Third Generation Partnership Project, "Technical Specification Group Radio Access Network; Evolved Universal Terrestrial Radio Access (E-UTRA) User Equipment (UE) procedures in idle mode (Release 8)," 3GPP TS 36.304 V1.0.0 (Jun. 2007).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.3.0 (Sep. 2008).
Samsung, "Summary of Reflector Discussions on EUTRA UL RS," 3GPP TSG RAN WG1 #50bis, R1-074068, Shanghai, China (Oct. 8-12, 2007).
Third Generation Partnership Project, "Technical Specification Group Radio Access Network; Evolved Universal Terrestrial Radio Access (E-UTRA); Physical layer procedures (Release 8)," 3GPP TS 36.213 V8.0.0 (Sep. 2007).
Third Generation Partnership Project, "Technical Specification Group Radio Access Network; Evolved Universal Terrestrial Radio Access (E-UTRA); Physical layer procedures (Release 8)," 3GPP TS 36.213 V8.4.0 (Sep. 2008).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.8.0 (Sep. 2007).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.3.0 (Sep. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project, "Technical Specification Group Radio Access Network; Physical channels and mapping of transport channels onto physical channels (FDD) (Release 8)," 3GPP TS 25.211 V8.2.0 (Sep. 2008).
Third Generation Partnership Project, "Technical Specification Group Radio Access Network; Spreading and modulation (FDD) (Release 1999)," 3GPP TS 25.213 V3.9.0 (Dec. 2003).
Third Generation Partnership Project, "Technical Specification Group Radio Access Network; Spreading and modulation (FDD) (Release 4)," 3G TS 25.213 V4.4.0 (Dec. 2003).
Third Generation Partnership Project, "Technical Specification Group Radio Access Network; Spreading and modulation (FDD) (Release 5)," 3GPP TS 25.213 V5.6.0 (Jun. 2005).
Third Generation Partnership Project, "Technical Specification Group Radio Access Network; Spreading and modulation (FDD) (Release 6)," 3GPP TS 25.213 V6.5.0 (Mar. 2006).
Third Generation Partnership Project, "Technical Specification Group Radio Access Network; Spreading and modulation (FDD) (Release 7)," 3GPP TS 25.213 V7.3.0 (Sep. 2007).
Third Generation Partnership Project, "Technical Specification Group Radio Access Network; Spreading and modulation (FDD) (Release 7)," 3GPP TS 25.213 V7.6.0 (Sep. 2008).
Third Generation Partnership Project, "Technical Specification Group Radio Access Network; Spreading and modulation (FDD) (Release 8)," 3GPP TS 25.213 V8.2.0 (Sep. 2008).
Nokia Siemens Network et al., "Uplink DM reference signal structure—open issues," 3GPP TSG RAN WG1 Meeting #49, R1-072293, Kobe, Japan (May 7-11, 2007).
Motorola, "E-UTRA Uplink DM RS Issues," 3GPP TSG RAN1#51, R1-074573, Jeju, Korea (Nov. 5-9, 2007).

(56) References Cited

OTHER PUBLICATIONS

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.3.0 (Sep. 2008).

* cited by examiner

METHOD AND APPARATUS OF SIGNALING AND PROCEDURE FOR SEQUENCE HOPPING PATTERN CHANGE DURING HANDOVER

CROSS REFERENCE TO RELATED APPLICATIONS

This application is a continuation of U.S. patent application Ser. No. 12/273,598, filed Nov. 19, 2008, which claims the benefit of U.S. Provisional Patent Application No. 60/989,327, filed on Nov. 20, 2007, which are incorporated by reference as if fully set forth.

FIELD OF INVENTION

This application is related to wireless communications.

BACKGROUND

Wireless communication systems are well known in the art. Communications standards are developed in order to provide global connectivity for wireless systems and to achieve performance goals in terms of, for example, throughput, latency and coverage. One current standard in widespread use, called Universal Mobile Telecommunications Systems (UMTS), was developed as part of Third Generation (3G) Radio Systems, and is maintained by the Third Generation Partnership Project (3GPP).

FIG. 1 illustrates a conventional packet-optimized radio access network, in this case a UMTS Terrestrial Radio Access Network (UTRAN). The UTRAN has one or more radio network controllers (RNCs) 104 and base stations 102, referred to as Node-Bs by 3GPP, which collectively provide for the geographic coverage for wireless communications with WTRUs 100, referred to as user equipments (UEs) by 3GPP. The geographic coverage area of a Node-B 102 is referred to as a cell. The UTRAN is connected to a core network (CN) 106.

An objective of the Evolved Universal Mobile Telecommunications System (UMTS) Terrestrial Radio Access (E-UTRA) program and the UMTS Terrestrial Radio Access Network (UTRAN) program of the Third Generation Partnership Project (3GPP) is to develop a packet-optimized radio access network with high data rates, low-latency, and improved system capacity and coverage. To achieve these goals, an evolution of the radio interface as well as the radio network architecture should be considered. For example, instead of using code division multiple access (CDMA), currently used in 3GPP, Orthogonal Frequency Division Multiple Access (OFDMA) and FDMA are proposed air interface technologies to be used in the downlink and uplink transmissions, respectively. Another proposed change is to apply an all packet switched service in the long term evolution (LTE) project. This means voice calls will be made on a packet switched basis.

Sequence hopping (SH) of reference symbols (RS) for the physical uplink control channel (PUCCH) and the physical uplink shared channel (PUSCH) may be utilized in such packet-optimized radio access networks. For example, one bit in the dynamic broadcast channel (D-BCH) may be used to indicate whether SH is enabled for PUCCH RS, an acknowledge/negative- (or non-) acknowledge (ACK/NACK) signal, or a channel quality index (CQI). The selection may apply to both PUCCH and PUSCH, but not necessarily the same hopping pattern.

If hopping is disabled, the sequence group may be explicitly indicated. Five (5) bits are typically used to indicate 30 groups. If hopping is enabled, the signaling of the hopping pattern is yet to be determined (D-BCH or cell-specific). As the SH patterns used by different cells may be different, it is desirable to have a signaling method and apparatus for an SH pattern changes, such as for reference symbols, ACK/NACK signals, or CQI, that may occur during handover from a current cell to a target cell.

SUMMARY

Methods and apparatus are disclosed for updating a sequence hopping (SH) pattern of an uplink channel during handover from a current cell having a current SH pattern.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "cell" refers to a region associated with a base station, wherein a WTRU may communicate with the base station. It is noted that neighboring cells of may overlap. Additionally, it is possible for cells to move relative to one another, such as, for example, in a mesh network in which the base stations may be mobile units.

The present application includes methods and apparatus for updating a sequence hopping (SH) pattern of an uplink channel during handover of a WTRU from its current cell to a target cell that may have a different SH pattern.

Figure 1:
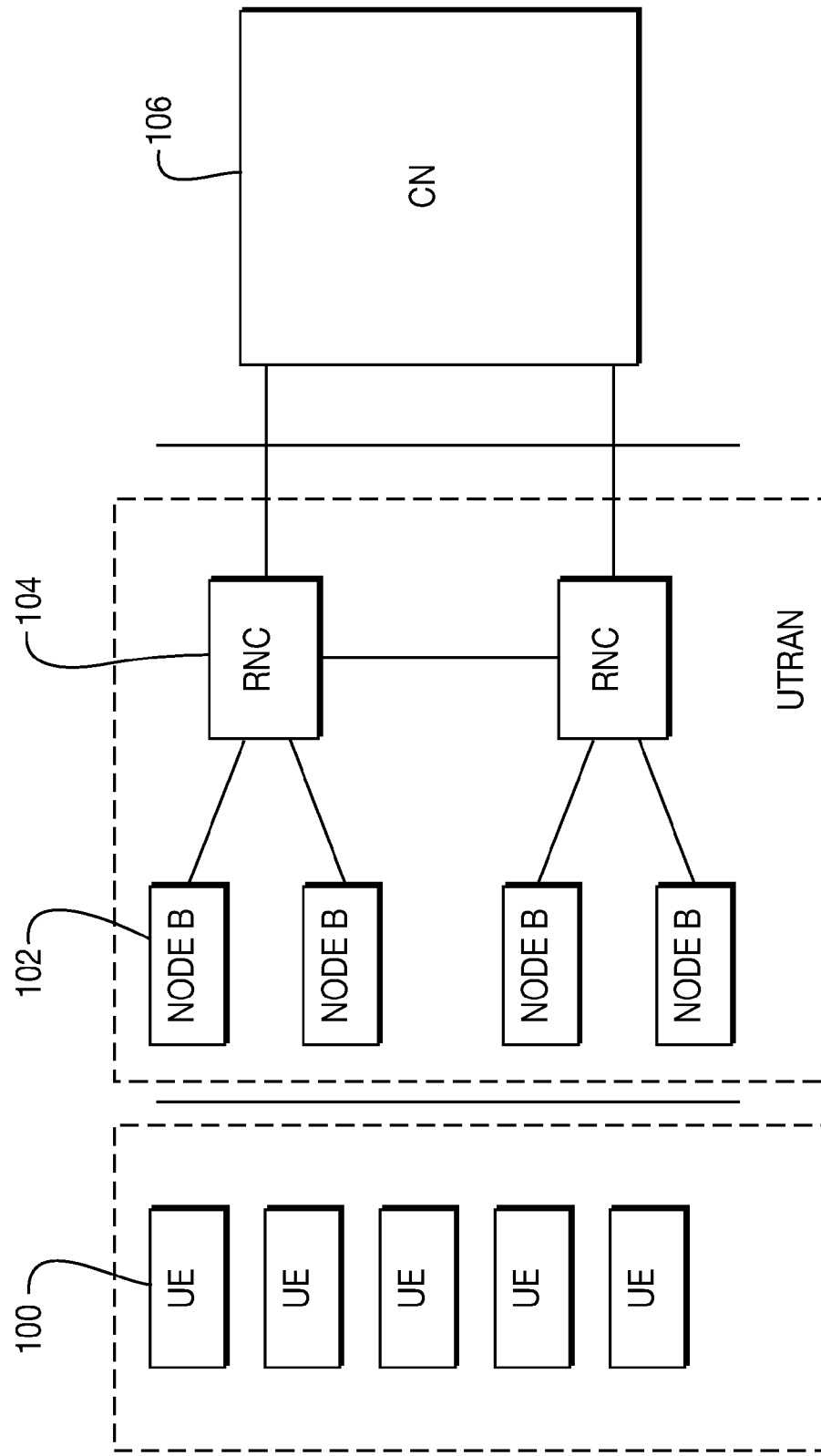
FIG. 1 is a schematic block diagram illustrating a conventional packet-optimized radio access network, such as a UTRAN.
Figure 2:
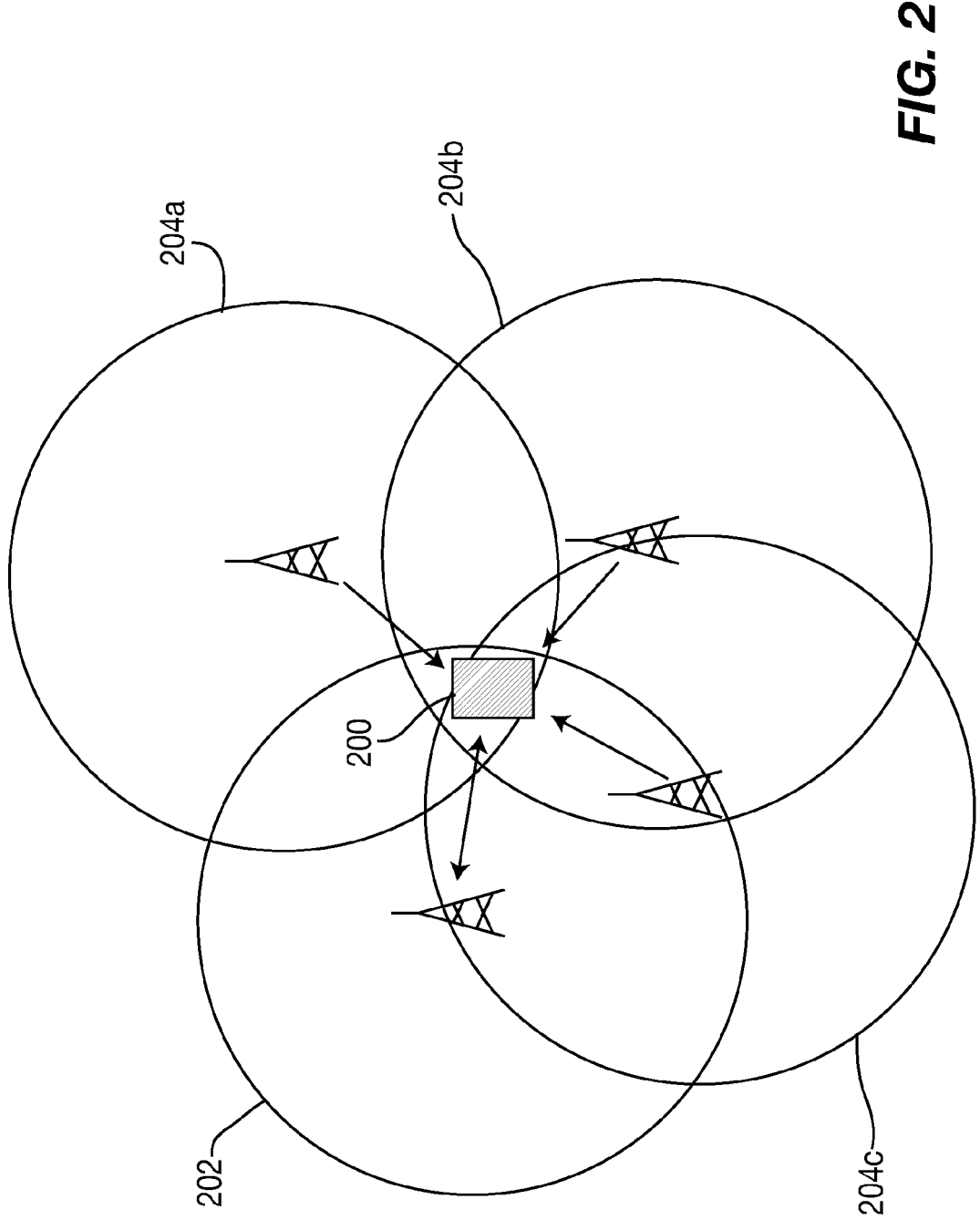
FIG. 2 is a schematic diagram illustrating an exemplary spatial location of a wireless transmit/receive unit (WTRU) relative to several cells of a packet-optimized radio access network.

FIG. 2 illustrates an exemplary spatial arrangement of WTRU 200 among current cell 202 and neighbor cells 204a-c within a packet-optimized radio access network. The arrows in FIG. 2 schematically illustrate uplink and/or downlink channels between the various cells and WTRU 200. During operation of this exemplary packet-optimized radio access network, exemplary WTRU 200 may move relative to the cells and/or one or more of the cells may move relative to the other cells. These relative movements may lead to the desirable handover of communication signals between WTRU 200 and the packet-optimized radio access network from current cell 202 to one of neighbor cells 204a-c.

Figure 3:
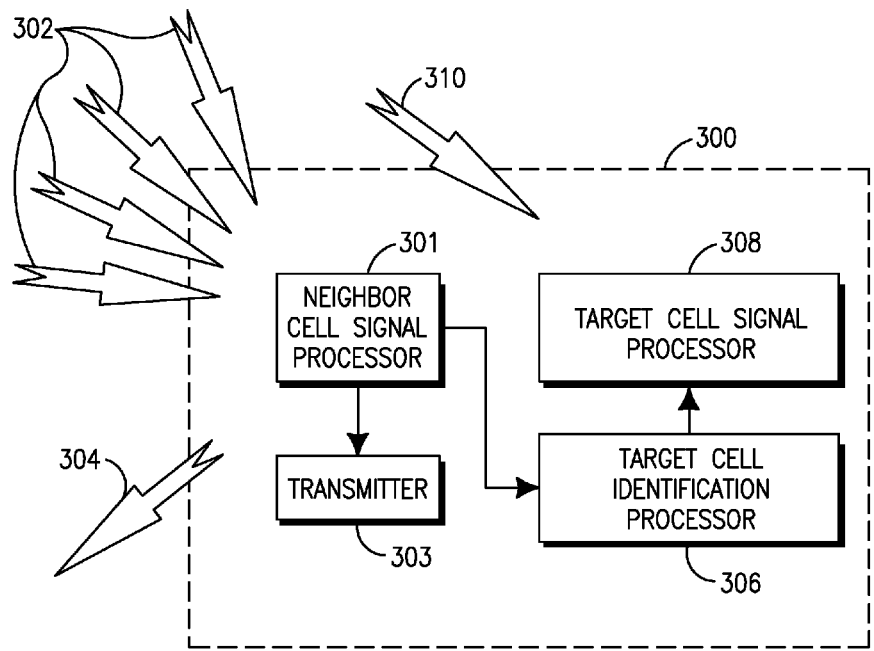
FIG. 3 is a schematic block diagram illustrating certain features of an exemplary WTRU according to the present application.

The teachings herein involve methods for updating the SH pattern of an uplink channel during such handovers and apparatus configured to perform these methods. FIG. 3 illustrates certain features of exemplary WTRU 300, which is configured to update the SH pattern of an uplink channel during handover. These features include: neighbor cell signal processor 301; transmitter 303; target cell identification processor 306; and target cell signal processor 308.

Neighbor cell signal processor 301 is configured to monitor at least one downlink channel 302 of each neighbor cell and transmit information indicative of the monitored downlink channels to the current cell. Monitored downlink channel(s) 302 of each of the neighbor cells may include a broadcast channel (BCH).

Transmitter 303 may transmit the information indicative of monitored downlink channels 302 of the neighbor cells to the current cell on uplink channel 304, which may be a physical layer uplink control channel (PUCCH) or a physical layer uplink shared channel (PUSCH).

Neighbor cell signal processor 301 is configured to monitor downlink channel(s) 302 of each neighbor cell by determining, for each monitored downlink channel, measurement information associated with the monitored downlink channel. The information indicative of the monitored downlink channels 302 is then determined from this associated measurement information.

The information indicative of monitored downlink channels 302 may include a list of a predetermined number of neighbor cells arranged in order according to one or more selection criteria. These selection criteria may indicate various properties of the associated downlink channel, such as decreasing trigger quantity or decreasing report quantity. The trigger quantity of each neighbor cell is based on at least one of the reference signal received power (RSRP) or reference signal received quality (RSRQ) of the monitored downlink channel(s) of the neighbor cell. The report quantity of each neighbor cell may also be based on one or both of these detected properties of the downlink channel(s).

Alternatively, the information indicative of the monitored downlink channels of the neighbor cells transmitted by transmitter 303 may include the RSRP, RSRQ, or channel quality information (CQI) of each monitored downlink channel 302.

Target cell identification processor 306 is configured to identify an anticipated target cell from among the neighbor cells prior to receiving a handover command from the current cell. As described above, neighbor cell signal processor 301 may be configured to monitor at least one downlink channel 302 of each neighbor cell by determining, for each monitored downlink channel, measurement information associated with the monitored downlink channel, within a predetermined duration of time. Target cell identification processor 306 may select the anticipated target cell based on this measurement information of the monitored downlink channels of the neighbor cells.

Target cell signal processor 308 is configured to monitor common downlink channel 310, e.g. a broadcast channel (BCH), of the anticipated target cell and determine information representative of the target SH pattern of an uplink channel, e.g. a physical uplink control channel (PUCCH) or a physical uplink shared channel (PUSCH), of the target cell. This determination may be made prior to receiving the handover command from the current cell, so that WTRU 300 may update its uplink SH pattern right away upon receiving the handover command, assuming that the anticipated target cell coincides with the actual handover cell identified in the handover command.

The information representative of the SH pattern of the target cell includes at least one of: SH enable/disable information; absolute inter-sub-frame-number (SFN) timing information of the target SH pattern; relative inter-SFN timing information between the target SH pattern and the current SH pattern; absolute intra-SFN timing information of the target SH pattern; relative intra-SFN timing information between the target SH pattern and the current SH pattern; absolute start timing information of the target SH pattern; relative start timing information between the target SH pattern and the current SH pattern; absolute SH pattern duration information of the target SH pattern; relative SH pattern duration information between the target SH pattern and the current SH pattern; absolute SH pattern periodicity information of the target SH pattern; relative SH pattern periodicity information between the target SH pattern and the current SH pattern.

Target cell signal processor 308 is configured to determine information representative of the target SH pattern for one of: the reference symbol (RS); the CQI; or the acknowledge/not-acknowledge (ACK/NACK) signal of the uplink channel of the target cell.

Figure 4:
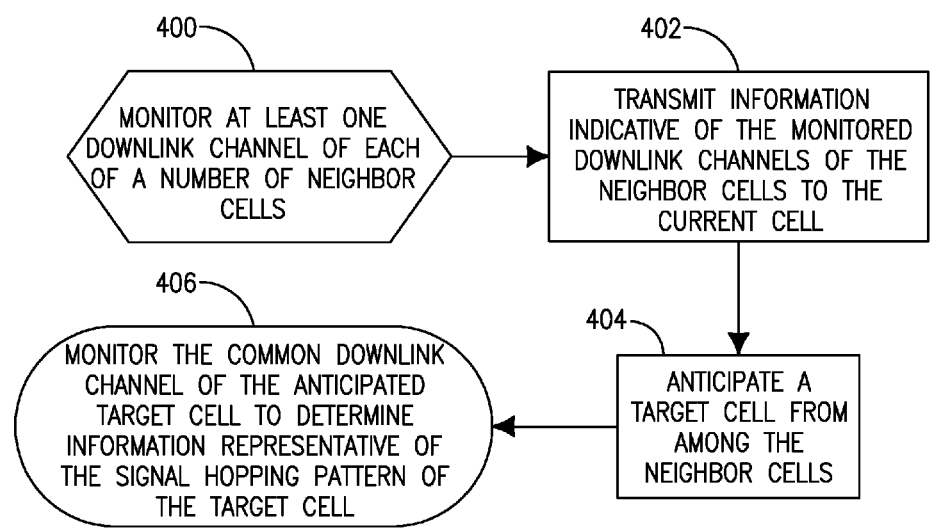
FIG. 4 is a flowchart illustrating an exemplary method for updating the SH pattern of an uplink channel during handover of a WTRU.

FIG. 4 illustrates an exemplary method for updating the SH pattern of an uplink channel during handover from a current cell to a target cell. This exemplary method may be performed using a WTRU, such as exemplary WTRU 300 of FIG. 3.

At least one downlink channel of each of a plurality of neighbor cells of the current cell is monitored, step 400. The monitored downlink channel(s) of each neighbor cell may include a BCH.

Information indicative of the monitored downlink channels of the neighbor cells is transmitted to the current cell, step 402. The information indicative of the monitored downlink channels of the neighbor cells is transmitted to the current cell on an uplink channel, which may be a PUCCH or a PUSCH.

The downlink channel(s) of each neighbor cell are monitored by determining, for each monitored downlink channel, measurement information associated with the monitored downlink channel. The information indicative of the monitored downlink channels is then determined from this associated measurement information.

The information indicative of monitored downlink channels may include a list of a predetermined number neighbor cells arranged in order according to one or more selection criteria. These selection criteria may indicate various properties of the associated downlink channel, such as decreasing trigger quantity or decreasing report quantity. The trigger quantity of each neighbor cell is based on at least one of the RSRP or RSRQ of the monitored downlink channel(s) of the neighbor cell. The report quantity of each neighbor cell may also be based on one or both of these detected properties of the downlink channel(s).

Alternatively, the information indicative of the monitored downlink channels of the neighbor cells transmitted may include the RSRP, RSRQ, or CQI of each monitored downlink channel.

Prior to receiving a handover command from the current cell: a target cell is anticipated from among the monitored neighbor cells, step 404; and a common downlink channel of the anticipated target cell is monitored to determine information representative of the target SH pattern of the target cell, step 406.

As described above, at least one downlink channel of each neighbor cell may be monitored by determining, for each monitored downlink channel, measurement information associated with the monitored downlink channel. The anticipated target cell is selected based on this measurement information of the monitored downlink channels of the neighbor cells.

A common downlink channel, e.g. a BCH, of the anticipated target cell is monitored and information representative of the target SH pattern of an uplink channel, e.g. a PUCCH or a PUSCH, of the target cell is determined.

The information representative of the SH pattern of the target cell includes at least one of: SH enable/disable information; absolute inter-SFN timing information of the target SH pattern; relative inter-SFN timing information between the target SH pattern and the current SH pattern; absolute intra-SFN timing information of the target SH pattern; relative intra-SFN timing information between the target SH pattern and the current SH pattern; absolute start timing information of the target SH pattern; relative start timing information between the target SH pattern and the current SH pattern; absolute SH pattern duration information of the target SH pattern; relative SH pattern duration information between the target SH pattern and the current SH pattern; absolute SH pattern periodicity information of the target SH pattern; relative SH pattern periodicity information between the target SH pattern and the current SH pattern.

The target SH pattern for which representative information is determined may be one of: the RS; the CQI; or the ACK/NACK signal of the uplink channel of the target cell.

Figure 5:
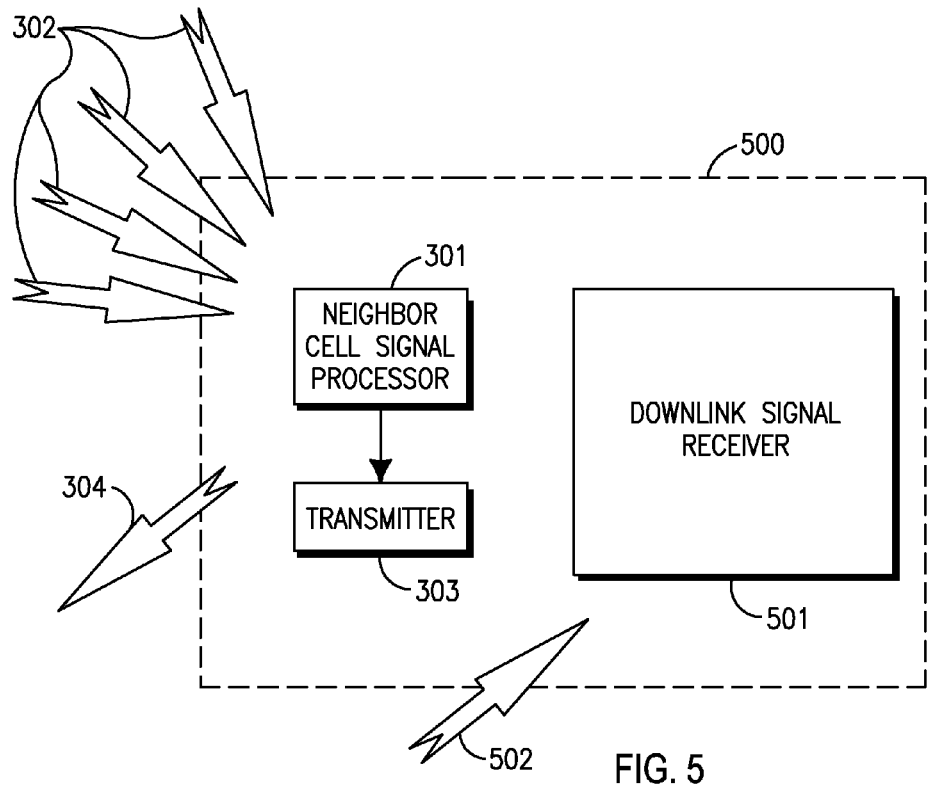
FIG. 5 is a schematic block diagram illustrating certain features of another exemplary WTRU according to the present application.

FIG. 5 illustrates another exemplary embodiment of the present application, WTRU 500. WTRU 500 may include neighbor cell signal processor 301, transmitter 303, and downlink signal receiver 501.

Neighbor cell signal processor 301 is configured to monitor at least one downlink channel of each neighbor cell of the current cell, prior to receiving the handover command from the current cell. Transmitter 303 is coupled to neighbor cell signal processor 301 to transmit information indicative of the monitored downlink channels of the neighbor cells to the current cell, prior to receiving the handover command from the current cell. Neighbor cell signal processor 301 and transmitter 303 of WTRU 500 may function similarly to exemplary neighbor cell signal processor 301 and exemplary transmitter 303 of WTRU 300, respectively, described in detail above.

Downlink signal receiver 501 is configured to receive a handover command from the current cell that includes identification of the target cell and information representative of the target SH pattern of the target cell.

Common downlink channel 502, e.g. a BCH, of the anticipated target cell may be monitored and information representative of the target SH pattern of an uplink channel, e.g. a PUCCH or a PUS CH, of the target cell is determined by downlink signal receiver 501.

The information representative of the SH pattern of the target cell includes at least one of: SH enable/disable information; absolute inter-SFN timing information of the target SH pattern; relative inter-SFN timing information between the target SH pattern and the current SH pattern; absolute intra-SFN timing information of the target SH pattern; relative intra-SFN timing information between the target SH pattern and the current SH pattern; absolute start timing information of the target SH pattern; relative start timing information between the target SH pattern and the current SH pattern; absolute SH pattern duration information of the target SH pattern; relative SH pattern duration information between the target SH pattern and the current SH pattern; absolute SH pattern periodicity information of the target SH pattern; relative SH pattern periodicity information between the target SH pattern and the current SH pattern.

The target SH pattern for which representative information is determined may be one of: the RS; the CQI; or the ACK/NACK signal of the uplink channel of the target cell.

Figure 6:
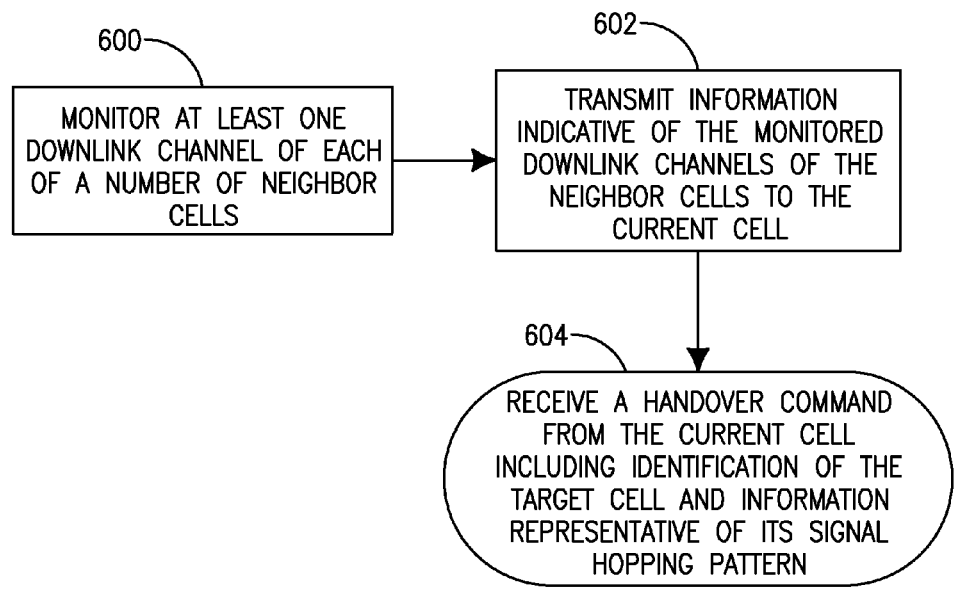
FIG. 6 is a flowchart illustrating another exemplary method for updating the SH pattern of an uplink channel during handover of a WTRU.

FIG. 6 illustrates another exemplary method for updating the SH pattern of an uplink channel during handover from a current cell to a target cell. This exemplary method may be performed using a WTRU, such as exemplary WTRU 500 of FIG. 5.

At least one downlink channel of each of a plurality of neighbor cells of the current cell may be monitored, step 600. As in the exemplary method of FIG. 4, the monitored downlink channel(s) of each neighbor cell may include a BCH.

Information indicative of the monitored downlink channels of the neighbor cells may be transmitted to the current cell, step 602. The information indicative of the monitored downlink channels of the neighbor cells may be transmitted to the current cell using any of the procedures described above with reference to the exemplary method of FIG. 4.

A handover command, including identification of a target cell and information representative of a target SH pattern of the target cell, is received from the current cell, step 604. The information representative of the target SH pattern may be for an uplink channel, e.g. a PUCCH or a PUSCH, of the target cell.

The information representative of the SH pattern of the target cell includes at least one of: SH enable/disable information; absolute inter-SFN timing information of the target SH pattern; relative inter-SFN timing information between the target SH pattern and the current SH pattern; absolute intra-SFN timing information of the target SH pattern; relative intra-SFN timing information between the target SH pattern and the current SH pattern; absolute start timing information of the target SH pattern; relative start timing information between the target SH pattern and the current SH pattern; absolute SH pattern duration information of the target SH pattern; relative SH pattern duration information between the target SH pattern and the current SH pattern; absolute SH pattern periodicity information of the target SH pattern; relative SH pattern periodicity information between the target SH pattern and the current SH pattern.

The target SH pattern for which representative information is determined may be one of: the RS; the CQI; or the ACK/NACK signal of the uplink channel of the target cell.

Although the features and elements are described in particular combinations, each feature or element can be used alone without the other features and elements or in various combinations with or without other features and elements. The methods provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The various processor described herein may be embodied in separate elements. Alternatively, it is contemplated that two or more of these exemplary processors may coexist within a single processor element.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

The present application includes exemplary apparatus and exemplary methods to update a SH pattern of an uplink channel during handover a WTRU. Although the application is illustrated and described herein with reference to specific embodiments, the application is not intended to be limited to the details shown. Rather, various modifications may be made in the details within the scope and range of equivalents of the claims and without departing from the application.

What is claimed is:

1. A wireless transmit/receive unit (WTRU) comprising:
   a receiver operatively connected to at least one processor, the receiver and the at least one processor are configured to receive, from a current cell, a handover command that instructs the WTRU to handover to a target cell, wherein the handover command includes an identification of the target cell and information representative of a sequence hopping pattern of the target cell;
   the at least one processor configured to perform handover to the target cell in accordance with the received handover command; and
   a transmitter operatively connected to the at least one processor, the transmitter and the at least one processor are configured to transmit to the target cell using the information representative of the sequence hopping pattern.

2. The WTRU of claim 1, wherein the handover command includes a sequence hopping enablement indication.

3. The WTRU of claim 1, wherein the information representative of the sequence hopping pattern is associated with a reference signal for a physical uplink shared channel (PUSCH).

4. The WTRU of claim 1, wherein the information representative of the sequence hopping pattern includes information for inter system frame number (SFN) sequence hopping.

5. The WTRU of claim 1, wherein the WTRU is a long term evolution (LTE) WTRU.

6. The WTRU of claim 1, wherein the information representative of the sequence hopping pattern is for a physical uplink shared channel (PUSCH).

7. A method for use by a wireless transmit/receive unit (WTRU), the method comprising:
   receiving, at the WTRU, a handover command from a current cell that instructs the WTRU to handover to a target cell, wherein the handover command includes an identification of the target cell and information representative of a sequence hopping pattern of the target cell;
   performing a handover, by the WTRU, to the target cell in accordance with the received handover command; and
   transmitting, by the WTRU, to the target cell using the information representative of the sequence hopping pattern.

8. The method of claim 7, wherein the information representative of the sequence hopping pattern is associated with a reference signal for a physical uplink shared channel (PUSCH).

9. The method of claim 7, wherein the information representative of the sequence hopping pattern includes information for inter system frame number (SFN) sequence hopping.

10. The method of claim 7, wherein the WTRU is a long term evolution (LTE) WTRU.

11. The method of claim 7, wherein the handover command includes a sequence hopping enablement indication.

12. The method of claim 7, wherein the information representative of the sequence hopping pattern is for a physical uplink shared channel (PUSCH).

13. A wireless communication device comprising:
   a receiver operatively connected to at least one processor, the receiver and the at least one processor are configured to receive information indicative of a monitored downlink channel of a neighbor cell from a wireless transmit/receive unit (WTRU); and
   a transmitter operatively connected to the at least one processor, the transmitter and the at least one processor are configured to transmit, to the WTRU, a handover command that instructs the WTRU to handover to a target cell in response to the received information,
   wherein the handover command includes an identification of the target cell and information representative of a sequence hopping pattern of the target cell.

14. The wireless communication device of claim 13, wherein the information representative of the sequence hopping pattern is associated with a reference signal for a physical uplink shared channel (PUSCH).

15. The wireless communication device of claim 13, wherein the wireless communication device is a long term evolution (LTE) base station, a Node B or an access point (AP).

16. The wireless communication device of claim 13, wherein the handover command includes a sequence hopping enablement indication.

17. The wireless communication device of claim 13, wherein the information representative of the sequence hopping pattern includes information for inter system frame number (SFN) sequence hopping.

18. The wireless communication device of claim 13, wherein the information representative of the sequence hopping pattern is for a physical uplink shared channel (PUSCH).

* * * * *